(12) United States Patent
Gillis et al.

(10) Patent No.: US 8,882,198 B2
(45) Date of Patent: Nov. 11, 2014

(54) SEAT HEIGHT ADJUSTMENT ACTUATING DEVICE

(75) Inventors: Russel Vincent Gillis, Schomberg (CA); Edilbert Delgado Yu, Ajax (CA)

(73) Assignee: Eurospec Manufacturing Inc., Newmarket (CA)

( * ) Notice: Subject to any disclaimer, the term of this patent is extended or adjusted under 35 U.S.C. 154(b) by 148 days.

(21) Appl. No.: 13/546,929

(22) Filed: Jul. 11, 2012

(65) Prior Publication Data

US 2013/0014603 A1 Jan. 17, 2013

Related U.S. Application Data

(60) Provisional application No. 61/506,396, filed on Jul. 11, 2011.

(51) Int. Cl.
 *F16D 67/02* (2006.01)
 *A47C 3/20* (2006.01)
 *F16H 31/00* (2006.01)
 *B60N 2/16* (2006.01)

(52) U.S. Cl.
 CPC ............. *F16H 31/002* (2013.01); *B60N 2/167* (2013.01)
 USPC ...................... 297/344.12; 192/223.2; 192/15

(58) Field of Classification Search
 USPC ............. 297/361.1, 362.12; 19/223.2, 15, 19; 192/223.2, 15, 19
 See application file for complete search history.

(56) References Cited

U.S. PATENT DOCUMENTS

| | | | |
|---|---|---|---|
| 4,648,575 A | 3/1987 | Kawade | |
| 6,206,164 B1 * | 3/2001 | Kurita | 192/223.2 |
| 6,212,965 B1 | 4/2001 | Hochmuth | |
| 6,481,557 B2 * | 11/2002 | Denis | 192/223.2 |
| 6,955,251 B2 * | 10/2005 | Kurita et al. | 192/19 |
| 7,032,731 B2 * | 4/2006 | Kim | 192/15 |
| 7,182,196 B2 | 2/2007 | Weber | |
| 7,651,164 B2 * | 1/2010 | Garnier et al. | 297/344.12 |
| 8,292,367 B2 * | 10/2012 | Park | 297/344.12 |
| 2007/0227854 A1 | 10/2007 | Cabrit et al. | |

* cited by examiner

*Primary Examiner* — Sarah B McPartlin
(74) *Attorney, Agent, or Firm* — Santosh K. Chari; Blake, Cassels & Graydon LLP

(57) ABSTRACT

An actuating device comprises a handle, a housing, and a driven member connected to the handle, the driven member being rotatable about a longitudinal axis thereof, the housing containing: a brake mechanism, for restricting rotation of the driven member when the brake mechanism is engaged; a means for disengaging the brake mechanism; a means for rotating the driven member in either the clockwise or counter-clockwise direction; and, a clutch mechanism for restricting reverse rotation of the driven member when driven in the clockwise or counter-clockwise direction. The actuating device of the invention is particularly suited for actuating a seat height adjustment mechanism of a vehicle.

18 Claims, 14 Drawing Sheets

Section cut C-C

Section cut D-D

Section cut E-E

Section cut F-F

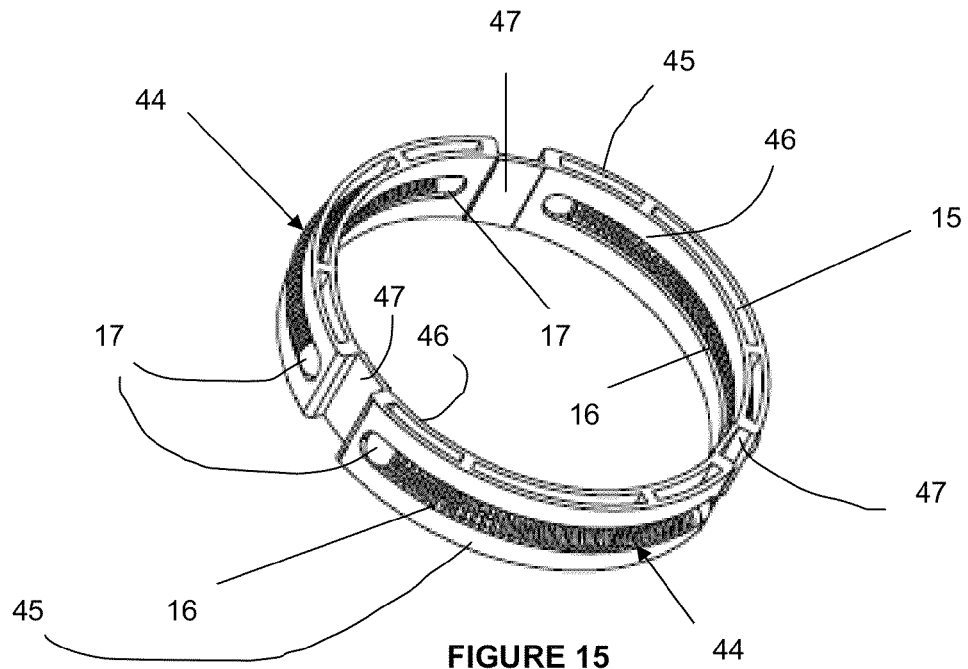
FIGURE 15
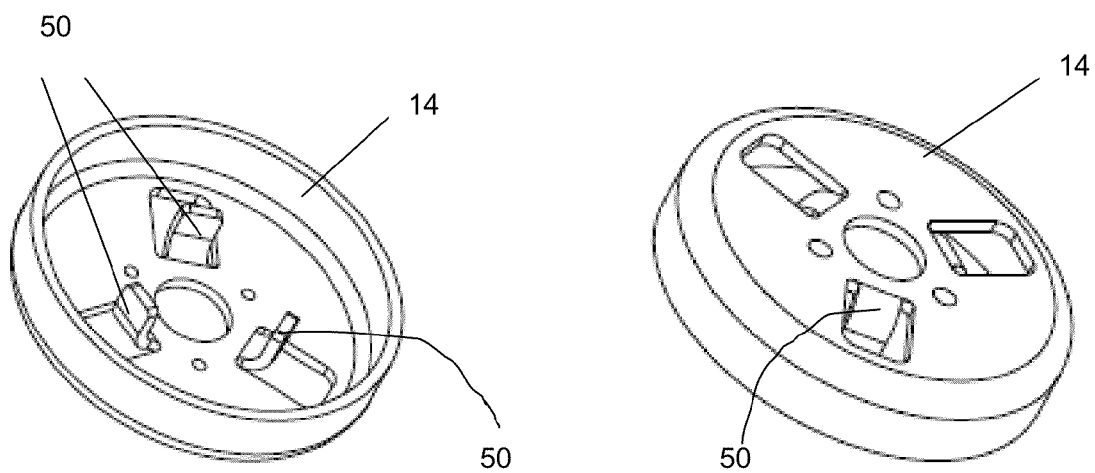
FIGURE 16
FIGURE 17

SEAT HEIGHT ADJUSTMENT ACTUATING DEVICE

CROSS REFERENCE TO RELATED APPLICATIONS

The present application claims priority to U.S. Application No. 61/506,396, filed on Jul. 11, 2011, the entire contents of which are incorporated herein by reference.

FIELD OF THE INVENTION

The present invention relates to manual seat lift devices, particularly for use in vehicles. More specifically, the invention relates to a seat lift device having clutch and brake mechanisms for actuating a seat height adjusting device a motor vehicle seat assembly.

BACKGROUND OF THE INVENTION

The seats in a motor vehicle, in particular the driver's seat, are typically provided with some device for adjusting the position thereof so as to ensure that the seat is at the desired height for the driver's visibility and at the desired spacing from the steering wheel and pedals. Many seats are also provided with other comfort settings that can also be adjusted. The adjusting devices can be either manual or powered by one or more motorized mechanisms. Motor vehicle seats are commonly formed with a frame, onto which the cushions and upholstery etc. are provided. Height adjustment devices are typically mounted to the frame so as to allow the entire seat assembly to be raised or lowered as needed.

Various devices and mechanisms are known in the art for manually adjusting the height of seats in vehicles. Generally, such devices comprise a manual actuator, such as a spring activated lever, that is connected to a seat height adjustment mechanism provided in a seat assembly. Such actuators are generally provided with a clamping or braking mechanism, for locking the height adjustment mechanism so as to position the seat at a desired height. The occupant of the seat engages the actuator to release the clamp or brake, adjusts the seat to a desired height, and releases the actuator to clamp the seat in the desired position. It is also common for such manual actuating devices to include a clutch mechanism to facilitate the height adjustment process by preventing the weight of the passenger from acting against the actuator. Examples of known manual seat adjustment devices and actuators are provided in the following documents: U.S. Pat. No. 4,648,575 (Kawade); U.S. Pat. No. 6,212,965 (Hochmuth); U.S. Pat. No. 7,182,196 (Weber); and U.S. Pat. No. 2007-0227854 (Cabrit).

Some of the known manual seat height actuators or devices utilize a friction-based mechanism for achieving the required clamping forces. In such known devices, a number of balls, i.e. ball bearings (U.S. Pat. No. 6,212,965) or rollers (U,S. Pat. No. 2007-0227854) are forced by springs into a space or channel bounded by two members. Once the balls are frictionally engaged into such channel, relative movement between the two members is prevented.

The mechanisms used in many known devices for raising and lowering of seats tend to be clumsy, cumbersome and difficult to operate. The known devices are also generally expensive (due, for example, to the use of machined components) and are either large and/or heavy, which are undesirable characteristics when manufacturing vehicles having cost constraints, and space and weight restrictions.

The present invention seeks to alleviate one or more of the drawbacks of the known seat height actuating devices.

SUMMARY OF THE INVENTION

In one aspect, the present invention provides a seat height adjusting device, which comprises a handle such as a lever or a rod etc., and a pinion gear or other such rotatable component that is adapted to engage a seat height adjustment mechanism of a seat assembly to raise or lower same. When the handle is in a neutral position, the device is maintained in a "brake" mode, wherein the pinion gear is not rotatable. In the brake mode, a brake mechanism of the device is engaged, and which prevents rotation of the pinion gear. The handle is adapted to be rotated in either the clockwise or counter-clockwise directions, preferably over a defined arc. Rotation of the handle actuates a clutch mechanism and disengages the brake mechanism. In turn, the rotation of the handle is translated to a rotation of the pinion gear.

In a preferred embodiment, one or both of the brake and clutch mechanisms utilize a number of ball bearings that are used to transfer rotational forces from the handle to other components so as to actuate the brake and clutch mechanisms. In one aspect, the ball bearings transfer such rotational forces by frictional contact between a rotating member, driven by the handle, to adjacent drums, such as a clutch drum and brake drum. The frictional contact is produced by wedging the ball bearings against the respective drums. In a preferred embodiment, the drums are provided with tapered or deformed portions to create the required wedges.

Thus, in one aspect, the present invention provides an actuating device comprising a rotatable handle and a rotatable driven member driven by the handle, wherein the device further comprises:

a brake mechanism for preventing rotation of the driven member;

a means for disengaging the brake mechanism and for allowing rotation of the driven member in either the clockwise or counter-clockwise direction; and, a clutch mechanism for preventing reverse rotation of the driven member while being rotated.

In another aspect, the invention provides actuating device comprising a handle, a housing, and a driven member connected to the handle, the driven member being rotatable about a longitudinal axis thereof, the housing containing:

a brake mechanism, for restricting rotation of the driven member when the brake mechanism is engaged;

a means for disengaging the brake mechanism;

a means for rotating the driven member in either the clockwise or counter-clockwise direction; and, a clutch mechanism for restricting reverse rotation of the driven member when driven in the clockwise or counter-clockwise direction.

In another aspect, the brake mechanism of the actuating device comprises:

a brake drum and a hub, the brake drum and hub being generally coaxially aligned and wherein the brake drum has a larger radius than the hub; and, a plurality of brake rotating members positioned between the hub and the brake drum, the brake rotating members being in frictional contact with an outer surface of the hub and an inner surface of the brake drum.

In another aspect, the clutch mechanism comprises:

a driver drum and a clutch drum, the driver drum and clutch drum being generally coaxially aligned, and wherein the driver drum has a larger radius than the clutch drum; and, a plurality of clutch rotating members positioned between the driver drum and the clutch drum, the clutch rotating members being in frictional contact with an inner surface of the driver drum and an outer surface of the clutch drum.

In one aspect, the brake and clutch rotating members comprise ball bearings or rollers. In another aspect, the clutch rotating members are constrained within a cage.

In one aspect, the handle includes a motion translating means for translating motion of the handle to the driver drum. In another aspect, the clutch drum includes a motion translation means for translating motion of the clutch drum to the brake drum.

BRIEF DESCRIPTION OF THE DRAWINGS

The features of the invention will become more apparent in the following detailed description in which reference is made to the appended drawings wherein:

FIG. 15 is a side perspective view a clutch sub-assembly of the actuating device of the invention, comprising a clutch carriage, clutch springs and clutch ball bearings according to an aspect of the invention.

FIG. 16 is a top perspective view of the clutch drum of FIG. 15.

FIG. 17 is a rear perspective view of the clutch drum of FIG. 15.

DETAILED DESCRIPTION OF THE INVENTION

This present invention relates to a manual seat lift height adjusting device that controls or actuates a height adjusting mechanism of a seat assembly (i.e. the frame, cushions, springs etc. that form a vehicle seat). One example of a height adjustment mechanism provided on a seat assembly is shown in U.S. Pat. No. 4,648,575. It will be understood that the present invention is not limited to any particular height adjustment. The actuating mechanism of the present invention actuates the height adjustment mechanism of a seat assembly to raise or lower the seat assembly. It will be understood by persons skilled in the art that the springs, levers and other mechanisms that cause the raising or lowering of a seat are typically provided within the seat assembly and that such devices/mechanisms are known in the art. Thus, the device of the invention provides a means for actuating such height adjustment mechanisms of a seat assembly. Therefore, the terms "device" or "seat lift height adjustment mechanism" etc., as used herein with reference to the present invention, will be understood to mean the actuating means that connects to a further mechanism provided in a seat assembly.

Figure 1:
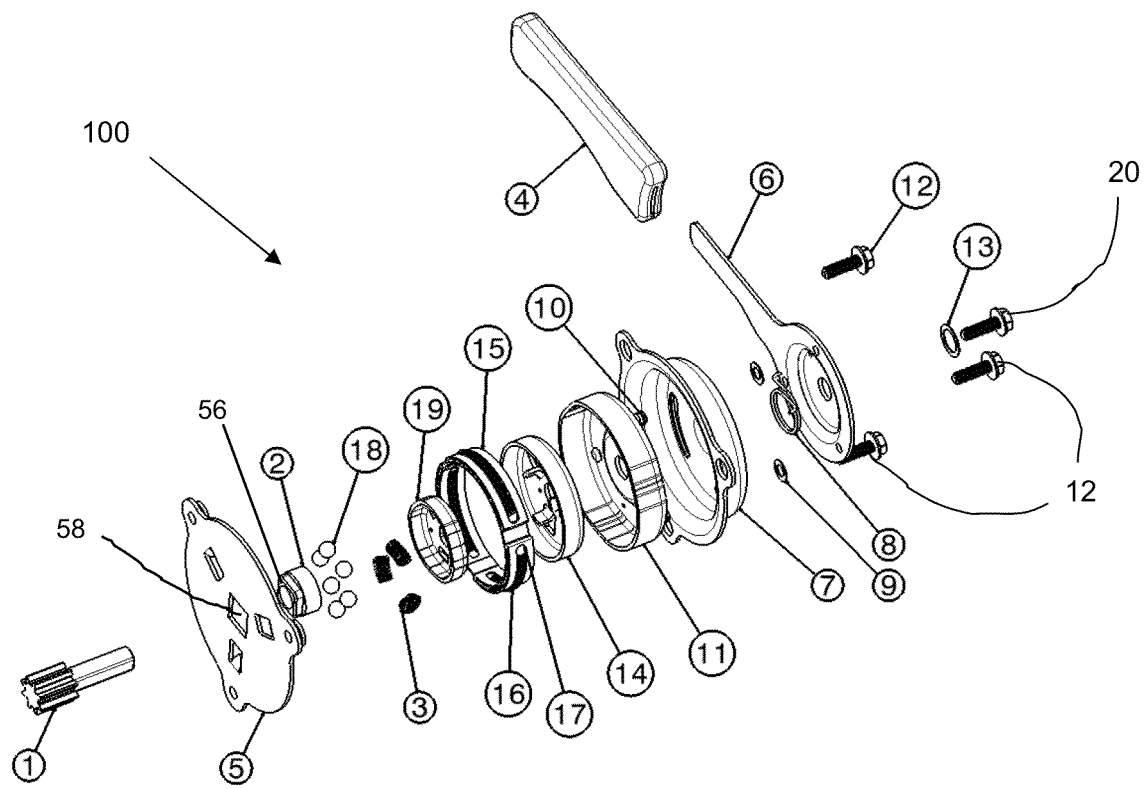
FIG. 1 is an exploded view of a seat height actuating device according to an aspect of the invention.
Figure 2:
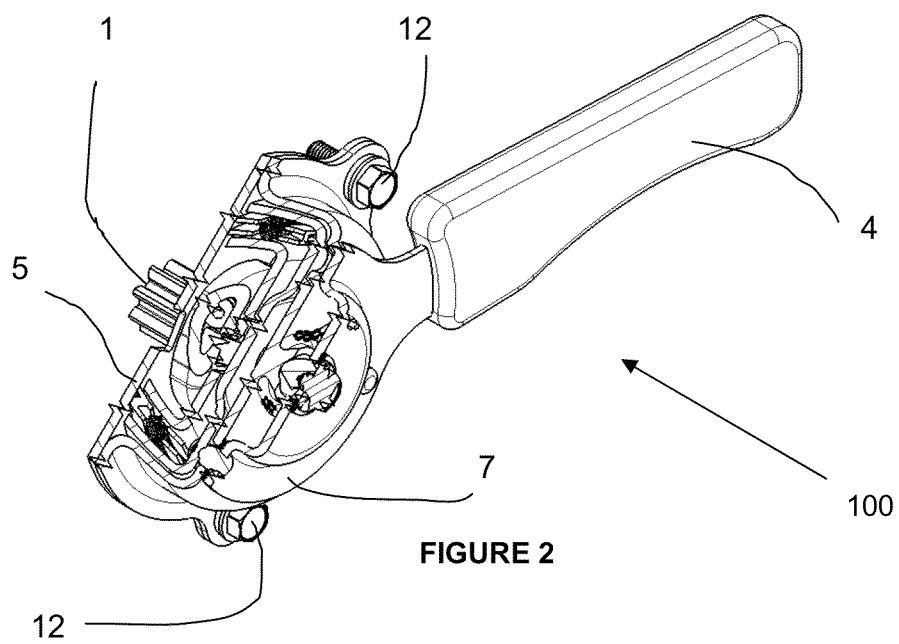
FIG. 2 is a perspective sectional view of the actuating device of FIG. 1.

Referring to FIG. 1, a seat lift height adjusting device or mechanism 100, according to one aspect of the invention, is illustrated in exploded view to show the various components making up the device as well as the assembly process for constructing same. FIG. 2 shows a broken, isometric view of the assembled part of the seat lift mechanism while FIGS. 3 and 4 show the complete assembly of the device according to an aspect of the invention.

Figure 3:
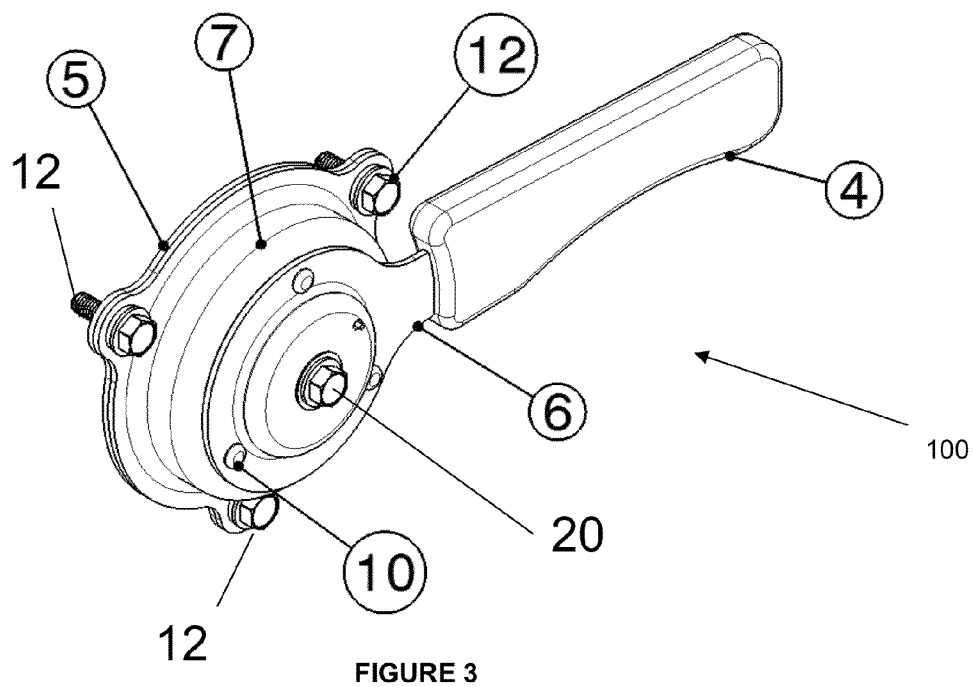
FIG. 3 is a front perspective view of the actuating device of FIG. 1.
Figure 4:
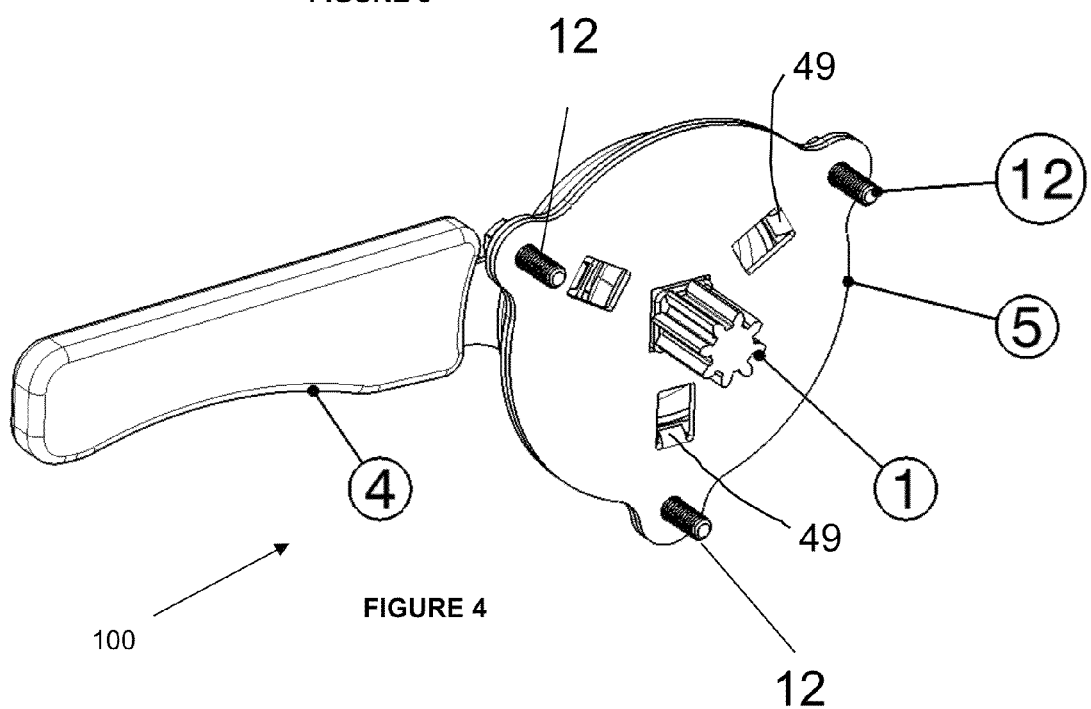
FIG. 4 is a rear perspective view of the actuating device of FIG. 1.
Figure 5:
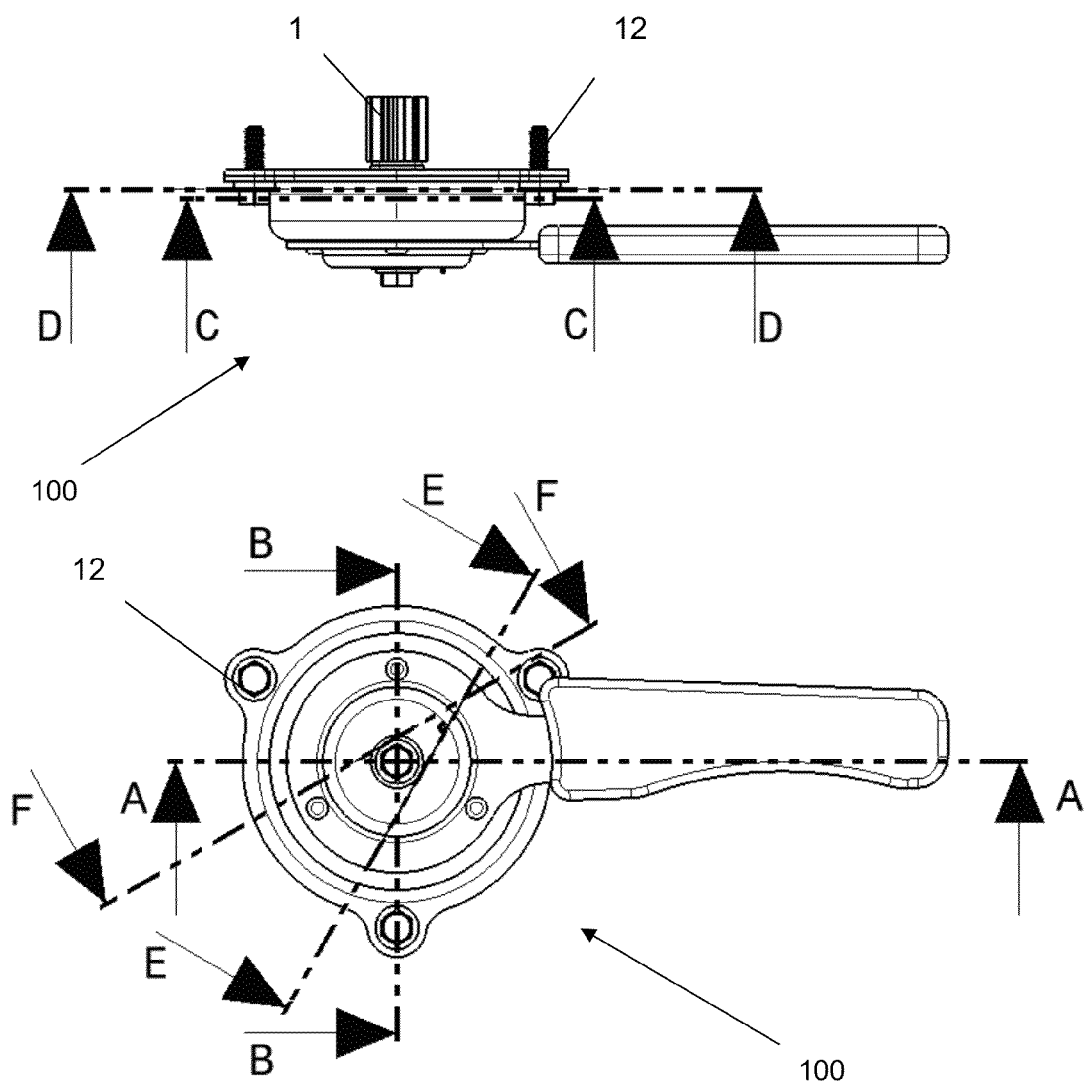
FIG. 5 illustrates top and front views of the actuating device of FIG. 1.
Figure 20:
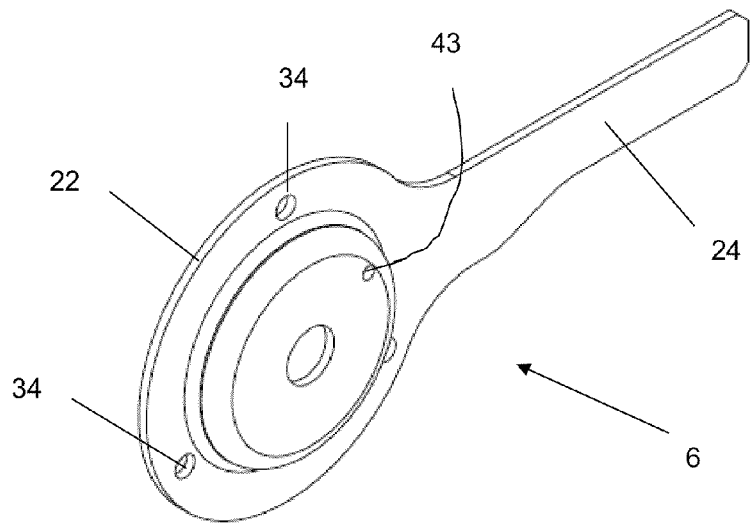
FIG. 20 is a perspective view of a handle plate according to an aspect of the invention.

As shown for example in FIGS. 3 and 4, the device 100 of the invention generally comprises an outer cup 7 (also shown in FIG. 23) to which are connected a handle plate 6 (or simply "handle") and an inner plate cover 5. The handle plate 6 is also shown in isolation in FIG. 20, which illustrates a mounting portion 22 and a handle portion 24. The terms "outer" and "inner" as used herein with respect to the device as a whole will be understood to be in the context of the device when in use, that is, when mounted on a seat assembly. In such case, the term "inner" will be understood to refer to the portion of the device that faces, or is placed against the seat, while the term "outer" will be understood to refer to the portion of the device that is directed away from the seat.

As shown in, for example FIGS. 1 to 4, the handle portion 24 of the handle plate 6 is preferably provided with a handle cover 4 or other such covering that can be engaged by a person sitting in the seat. As will be understood, the handle cover 4 may be designed for functional and/or aesthetic reasons. In terms of functional criteria, the handle cover 4 may be of a sufficient width and/or length for providing a comfortable and leveraged grip for the user, when turning the handle portion 24 of the handle plate 6. The invention is not limited to any type of handle cover 4.

The device is provided with a number of bolts 12 that secure the device 100 to a seat assembly. More particularly, the bolts 12 serve to secure the device 100 to the frame portion of the seat assembly. In the illustration shown in the enclosed figures, three, generally equidistantly spaced bolts 12 are used; however, it will be understood that any number bolts may be used with the invention. Similarly, although bolts 12 may be preferred, it will be understood that any other connecting means may be used for the same purpose of connecting the device 100 to a seat assembly.

Figure 21:
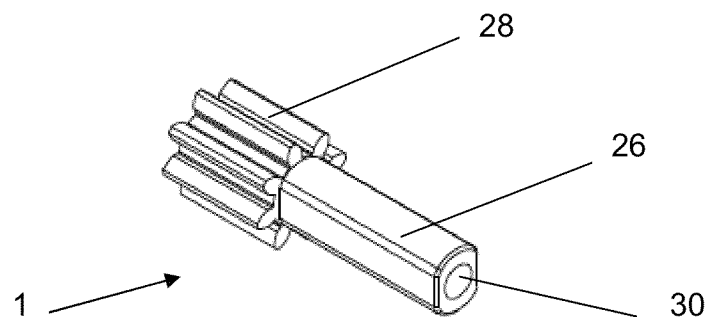
FIG. 21 is a perspective view of a pinion gear according to an aspect of the invention.

A pinion gear 1 extends through the inner plate cover 5 and serves as the drive means that connects the device, or actuator, 100 of the invention to a seat height adjustment mechanism provided in the seat assembly. In general, and as discussed further below, rotation of the handle plate 6 results in rotation of the pinion gear 1, which, in turn, actuates the height adjustment mechanism of the seat assembly. As shown in FIG. 21, the pinion gear 1 comprises a body portion 26 and a gear portion 28. Although the gear portion 28 is shown with a plurality of teeth, which would engage a suitably shaped drive gear, it will be understood that any other orientation of the gear portion 28 can be used to provide the required rotational drive means.

As described further below, the outer cup 7 serves as an enclosure for containing brake and clutch mechanisms to assist in controlling the motion of the pinion gear 1.

Figure 6:
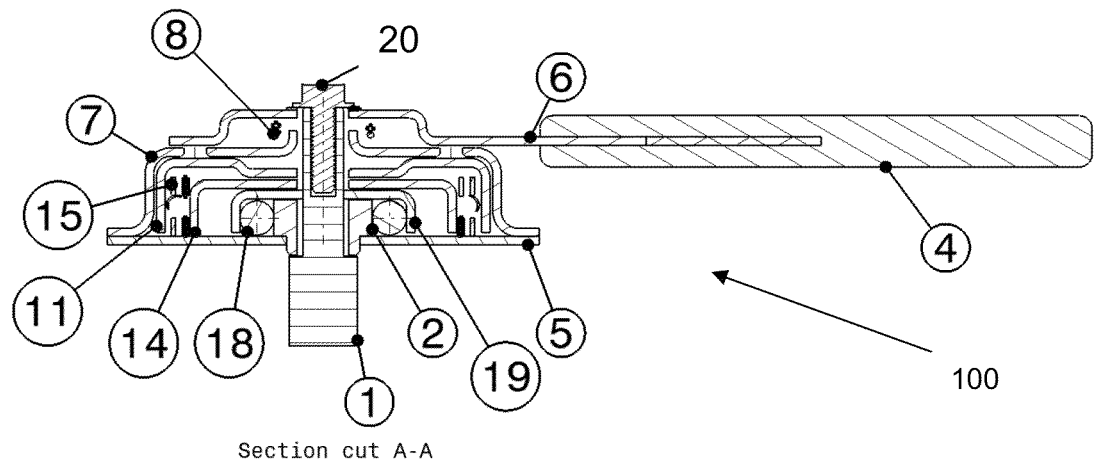
FIG. 6 is a cross sectional elevation of the actuating device of FIG. 1, through the lines A-A of FIG. 5.
Figure 7:
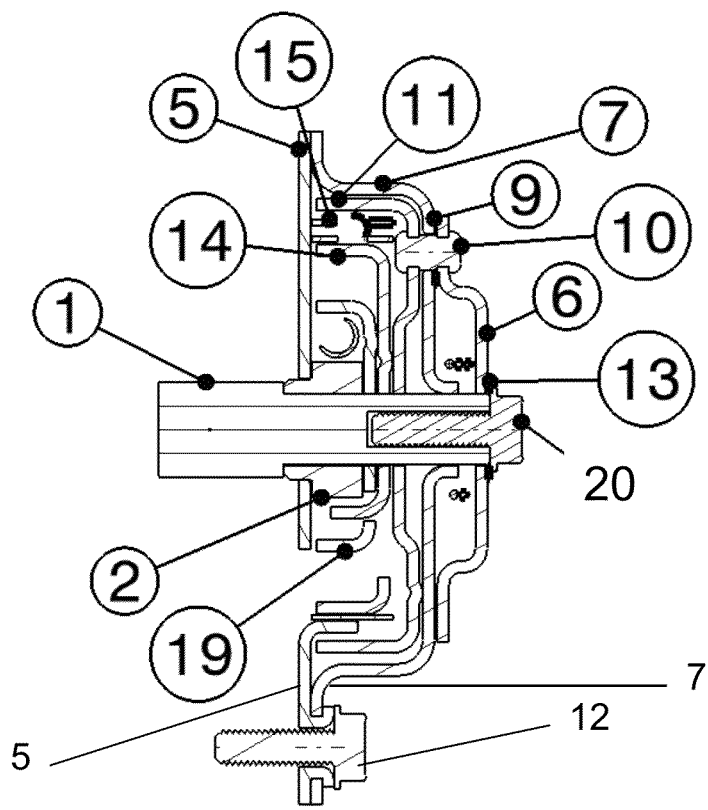
FIG. 7 is a cross sectional end view of the actuating device of FIG. 1, through the lines B-B of FIG. 5.

FIGS. 6 and 7 show, respectively, horizontal and vertical sectional views of the device 100 according to an embodiment of the invention, and illustrate how the embodiment of the device 100 is assembled. As shown, the pinion gear 1 is secured to the device 100 by a generally centrally provided bolt 20 (as explained below), which extends through a brake hub 2, preferably through a pinion washer 13, and the handle plate 6.

Figure 13:
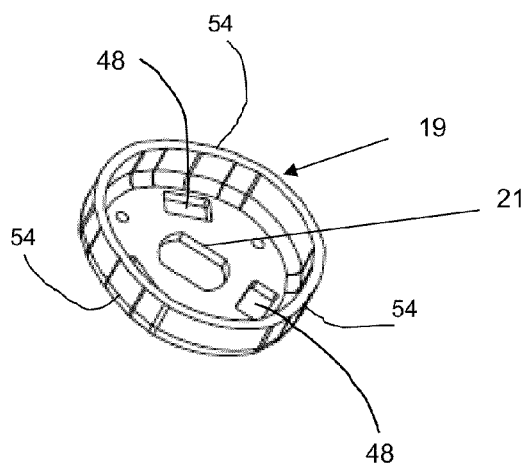
FIG. 13 is a top perspective view of the brake drum of FIG. 12.
Figure 14:
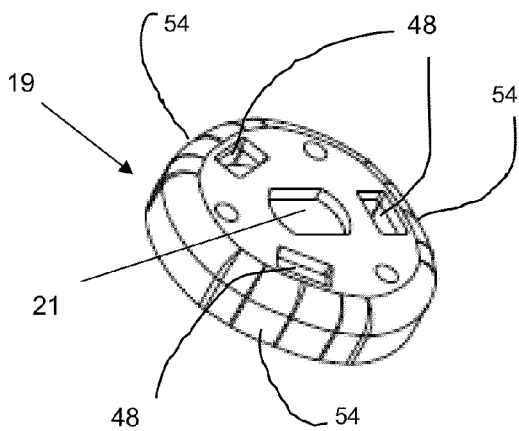
FIG. 14 is a rear perspective view of the brake drum of FIG. 12.

The pinion gear 1 is held in place with respect to a brake drum 19 by means of a slotted feature, as shown in FIGS. 13 and 14. That is, the brake drum 19 is provided with a slot 21 that is adapted to receive the body portion 26 of the pinion gear 1, as shown in FIG. 21, having a corresponding shape. Due to the arrangement of the slot 21 and the corresponding shape of the body portion 26, it will be understood that rotation of the pinion gear 1 is therefore tied to the rotation of the brake drum 19, whereby relative rotation between the gear 1 and the brake drum 19 is prevented. As shown in FIG. 21, the pinion gear 1 includes a threaded opening 30 that is adapted to receive and engage the threaded end of the bolt 20. Thus, the bolt 20, when combined with the pinion gear 1, serves to maintain the actuating device 100 in the assembled state. As will be understood, the mounting of the device 100 to a seat assembly, using bolts 12, will also serve to keep the device in such assembled state. However, it will be understood that in some embodiments, the inner cover plate 5 and outer cup 7 may be secured together in other ways such as by welding or another set of bolts etc. In certain cases, such as where further weight or size reduction is needed, the welding of the cover plate 5 and outer cup 7 may be preferred.

Figure 18:
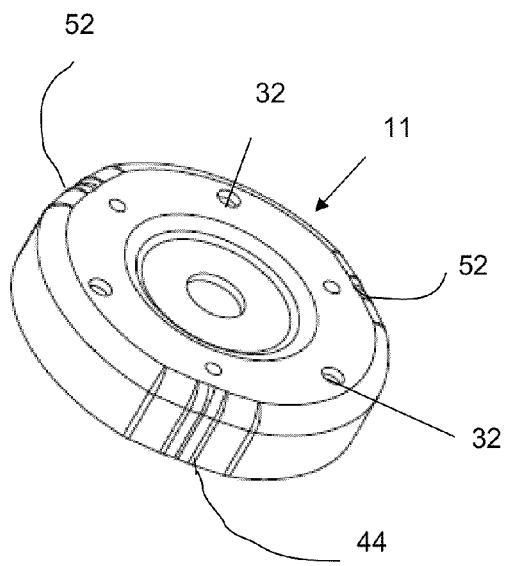
FIG. 18 is a top perspective view of a driver drum according to an aspect of the invention.
Figure 19:
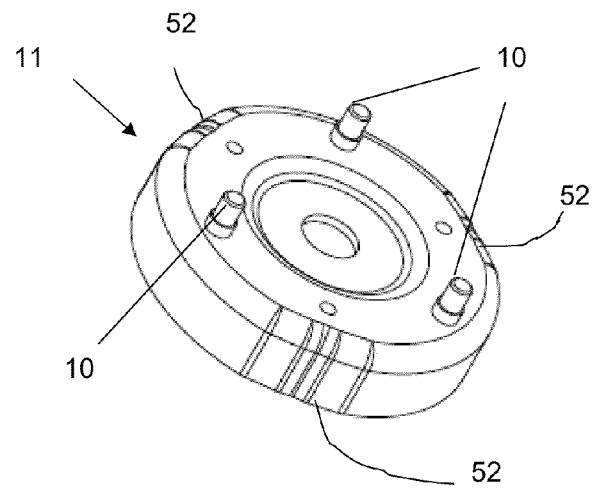
FIG. 19 is a top perspective view of a driver drum according to an aspect of the invention, including handle plate rivets for engaging a handle plate.
Figure 23:
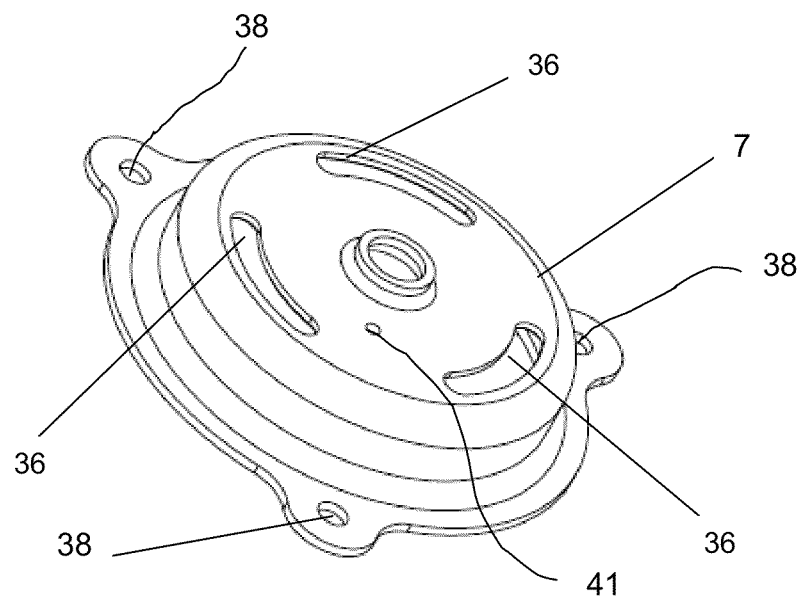
FIG. 23 is a top perspective view of an outer cup according to an aspect of the invention.
Figure 24:
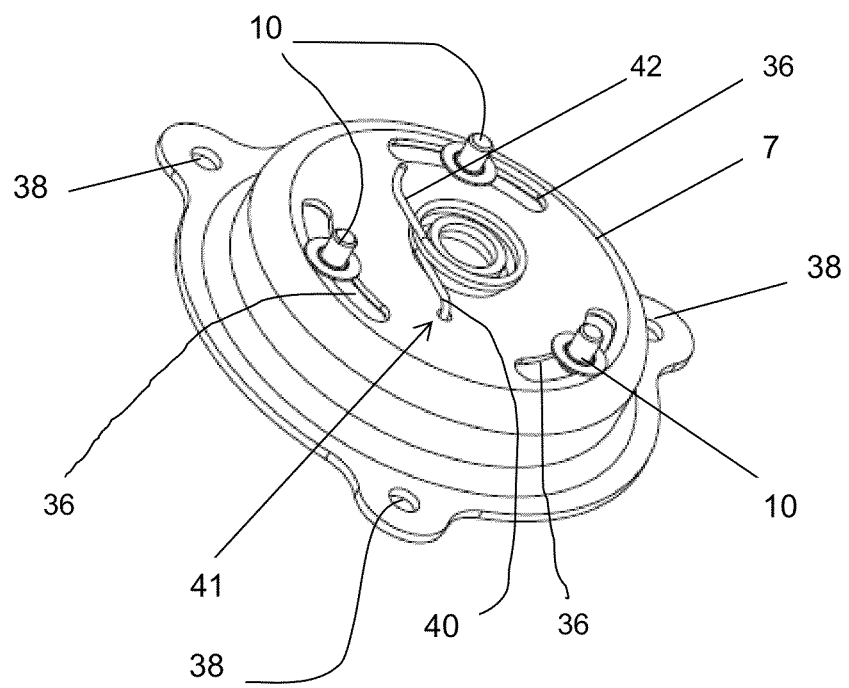
FIG. 24 is a top perspective view of a sub-assembly comprising an outer cup and a driver drum, according to an aspect of the invention.
Figure 25:
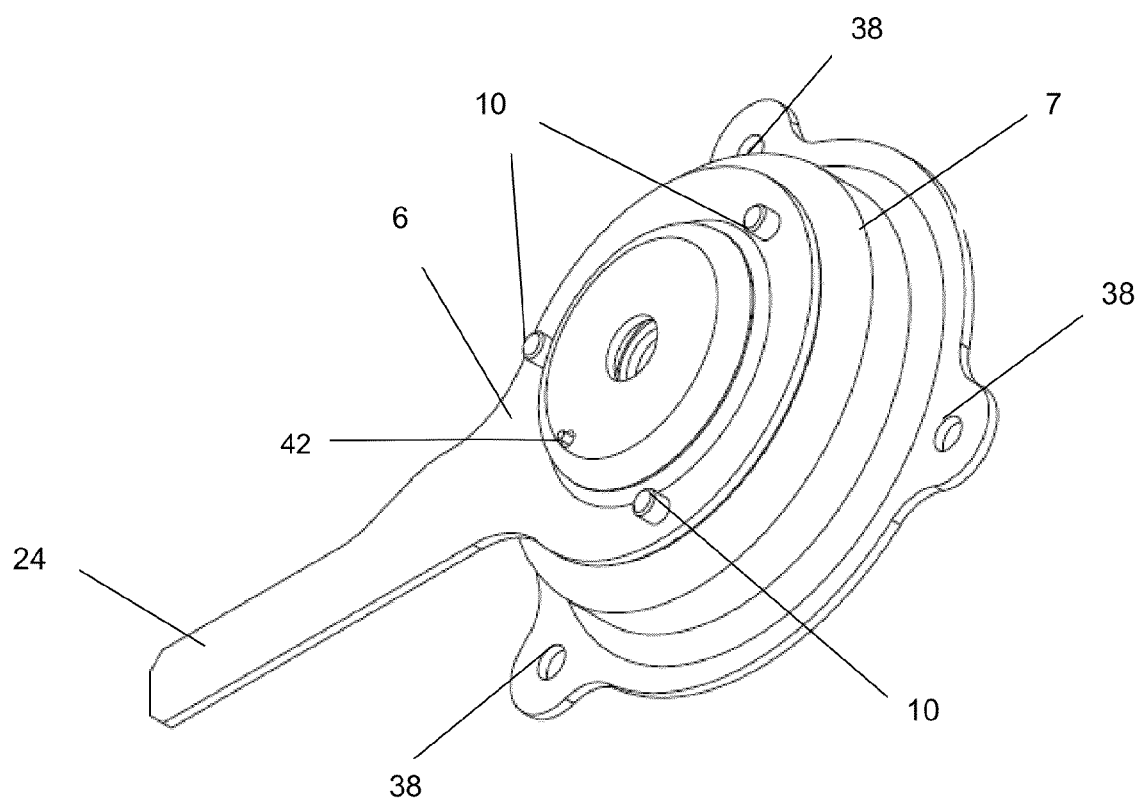
FIG. 25 is a top perspective view of a sub-assembly comprising an outer cup, a driver drum and a handle plate according to an aspect of the invention.

The seat height actuating device 100 is operated by the user moving the handle portion 24 of the handle plate 6, which drives handle plate rivets 10 that are fastened to a driver drum 11. The driver drum 11, with and without handle plate rivets 10 is shown in FIGS. 18 and 19, respectively. As shown, the rivets 10 extend through rivet openings 32 provided on driver drum 11. The handle plate rivets 10 are adapted to also extend through openings 34 provided in the mounting portion 22 of the handle plate 6. As will be understood, with such arrangement, rotation of the handle plate 6 would cause rotation of the driver drum 11 due to the mutual engagement of the handle plate rivets 10. FIGS. 23 to 25 illustrate the cooperative engagement between the outer cup 7 and the handle plate 6. As shown, the outer cup 7 encloses the driver drum 11 (as shown in FIG. 1 for example), wherein the handle plate rivets 10 of the driver drum 11 extend through curved slots 36 provided in the outer cup 7. In this arrangement, it will be understood that the driver drum 11 is able to be partially rotated within the outer cup 7, with the extent of such rotation being limited by the length of the slots 36. In other words, the curved slots 36 form tracks through which the rivets 10 are permitted to travel. As shown in FIG. 25, the openings 34 of the mounting portion 22 of the handle plate 6 receive the rivets 10. The outer cup 7 is provided with bolt holes 38 that are adapted to receive the bolts 12, which fasten the device 100 of the invention to a seat assembly, whereby, the outer cup is held stationary. Thus, as will be understood, with the arrangement shown, rotation of the handle plate 6 results in the rotational force being transferred to the rivets 10 and, subsequently to the driver drum 11. Thus, both the handle plate 6 and the driver drum 11 are then able to be rotated about the outer cup 7. The outer cup 7 is further preferably provided with a biasing means, such as a torsion spring 8, having a first end 40 secured to the outer cup 7 (such as by engagement through a hole 41 provided on the outer cup 7) and a second end 42 that is inserted into a hole 43 provided on the handle plate 6 (see FIG. 20). In this way, the biasing means serves to bias the handle plate 6 in one direction, wherein release of the handle forces the handle plate to resume a biased position.

Figure 8:
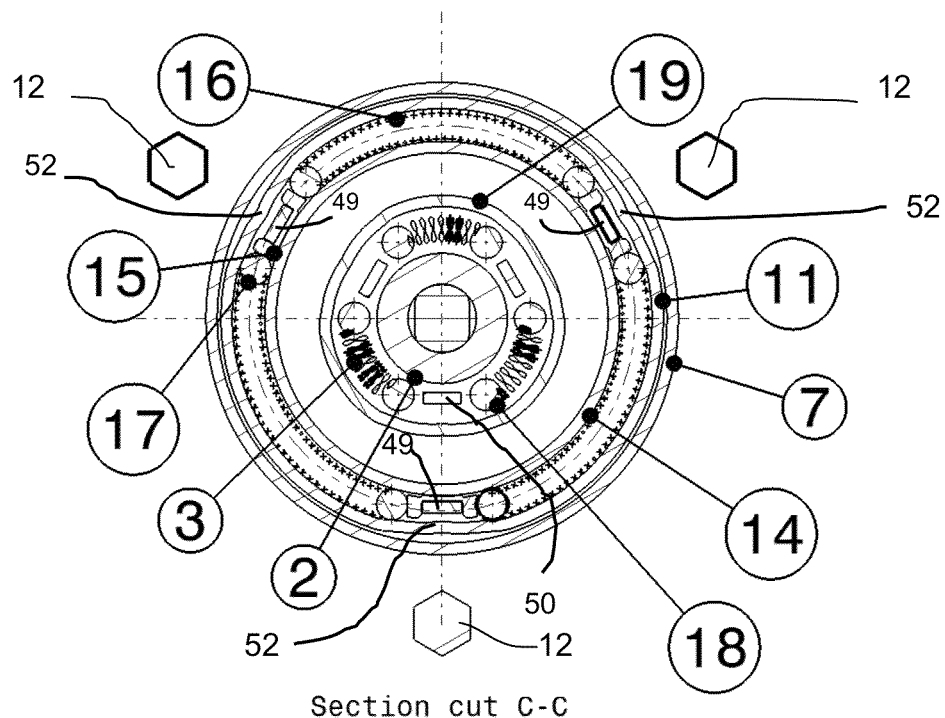
FIG. 8 is a cross sectional top view of the actuating device of FIG. 1, through the lines C-C of FIG. 5, illustrating the clutch mechanism of the invention.
Figure 9:
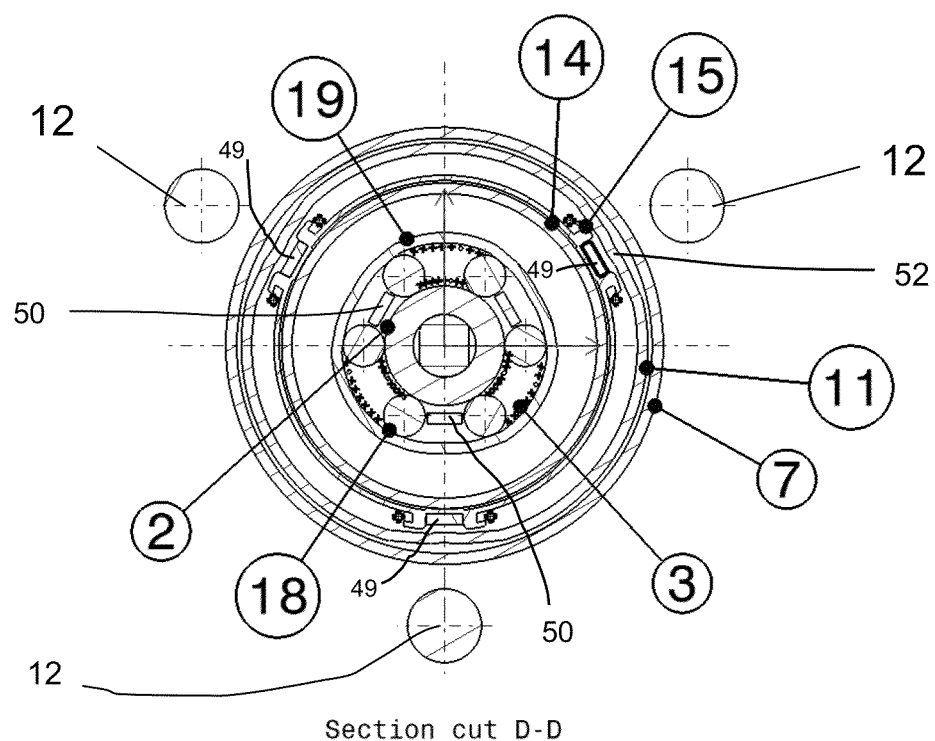
FIG. 9 is a cross sectional top view of the actuating device of FIG. 1, through the lines D-D of FIG. 5, illustrating the brake mechanism of the invention.
Figure 10:
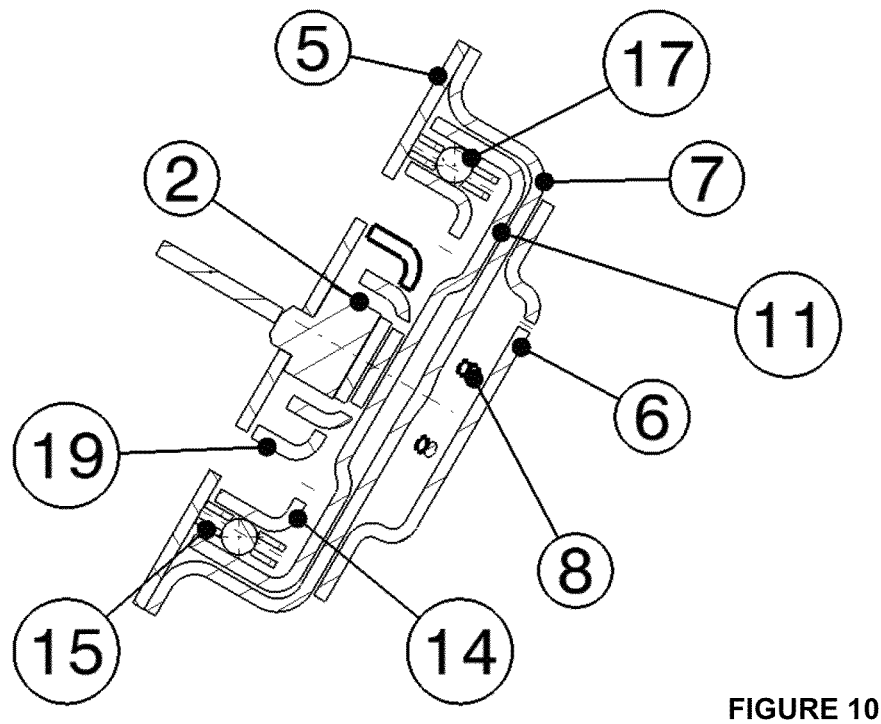
FIG. 10 is a cross sectional end view of the actuating device of FIG. 1, through the lines E-E of FIG. 5.
Figure 11:
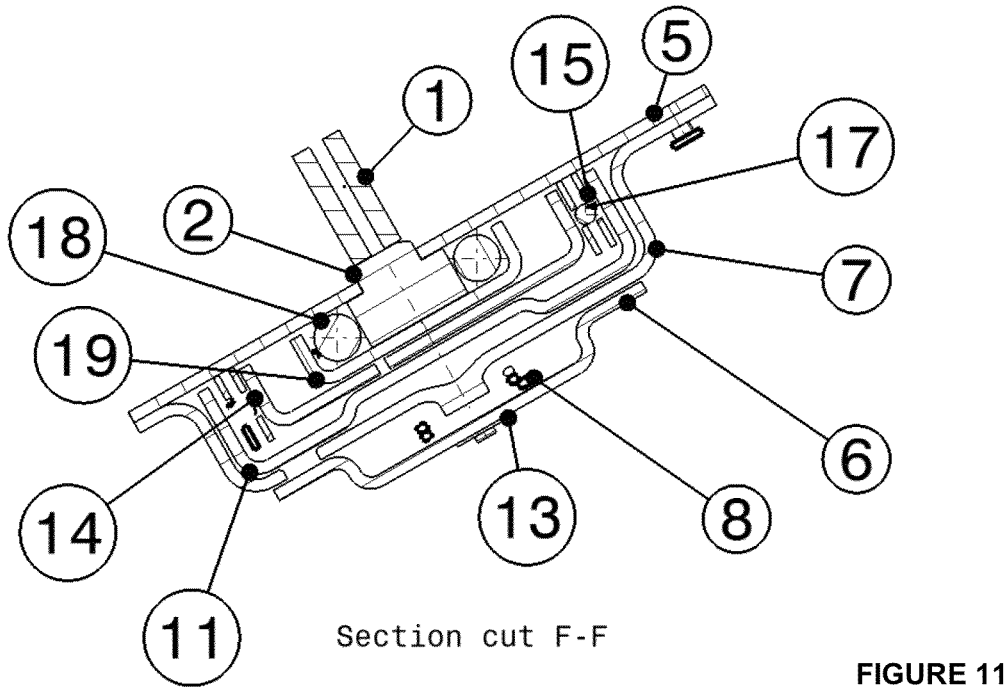
FIG. 11 is a cross sectional end view of the actuating device of FIG. 1, through the lines F-F of FIG. 5.

As shown for example in FIGS. 1, 8 and 9, the various components of the actuator 100 are combined in a generally coaxial manner, with sequential components being contained within each other. As shown in FIGS. 1, 8 and 9, moving from the outer diameter inwards, the device 100 comprise: the outer cup 7; the driver drum 11; a clutch drum 14; a brake drum 19 and a brake hub 2. It will be understood that the sizes or diameters of each component will be chosen so as to allow such structural arrangement.

Figure 22:
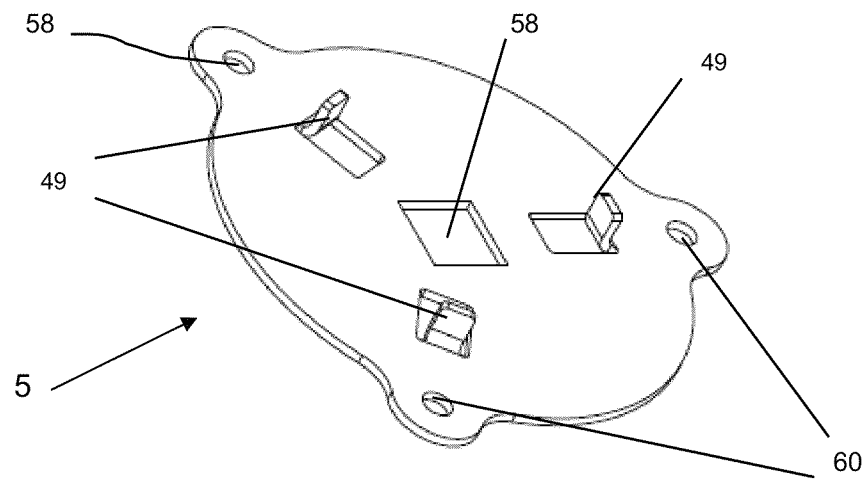
FIG. 22 is a top perspective view of an inner plate cover according to an aspect of the invention.

A clutch sub-assembly according to an aspect of the invention is provided by including between the driver drum 11 and the clutch drum 14, the assembly shown in FIG. 15. The assembly of FIG. 15 comprises a clutch carriage 15 having a generally ring-like structure. Preferably, the clutch carriage 15 is formed of a plastic, mainly to achieve weight reduction. However, any other material may be used to form the clutch carriage. The clutch carriage 15 comprises a number of circumferential races 44. In the embodiment shown in the figures, the clutch carriage 15 is provided with three races 44 that are generally equidistantly spaced about the circumference of the carriage 15. Each of the races 44 is fitted with a pair of clutch ball bearings 17 having a clutch spring 16 located there-between. The clutch springs 16 may comprise, for example, wound wire compression springs or urethane springs etc. In general, the clutch springs 16 serve to bias each of the ball bearings 17 of the respective pairs of ball bearings apart from each other, whereby each clutch ball bearing 17 of a given pair is urged against opposite edges of the respective race 44. Thus, any material that achieves this goal would be suitable for use as the clutch springs 16. Preferably, the carriage 15 is formed with a pair of walls, 45 and 46, so as to form a groove that is sized to frictionally house the ball bearings. Similarly, the clutch spring 16 is sized to be under tension when assembled in the carriage 15 with the clutch ball bearings 17. In such arrangement, the clutch springs 16 are also retained within the races 44. As shown in the figures, the clutch carriage 15 is provided with separators 47 so as to separate adjacent races 44 and, therefore, adjacent pairs of clutch ball bearings 17. As shown in FIG. 22, the inner plate cover 5 is preferably provided with tabs 49, which combine with the separators 47 to aid in such separation. The tabs 49 of the inner cover plate 5 also serve to positively locate the clutch carriage 15. As discussed above, the inner cover plate 5 is secured to the seat assembly and is therefore rendered immovable. In the result, the table 49 of the inner cover plate 5 serve as immovable stops for the clutch ball bearings 17.

Figure 26:
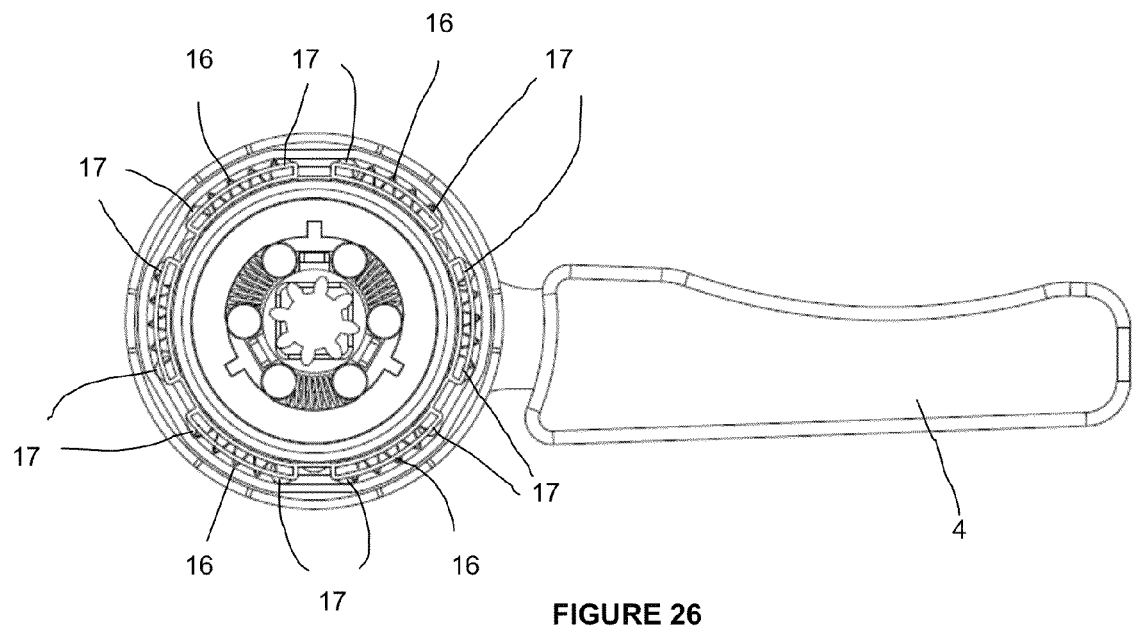
FIG. 26 is a cross sectional top view of another embodiment of the actuating device of the invention, illustrating another embodiment of the clutch mechanism.
Figure 27:
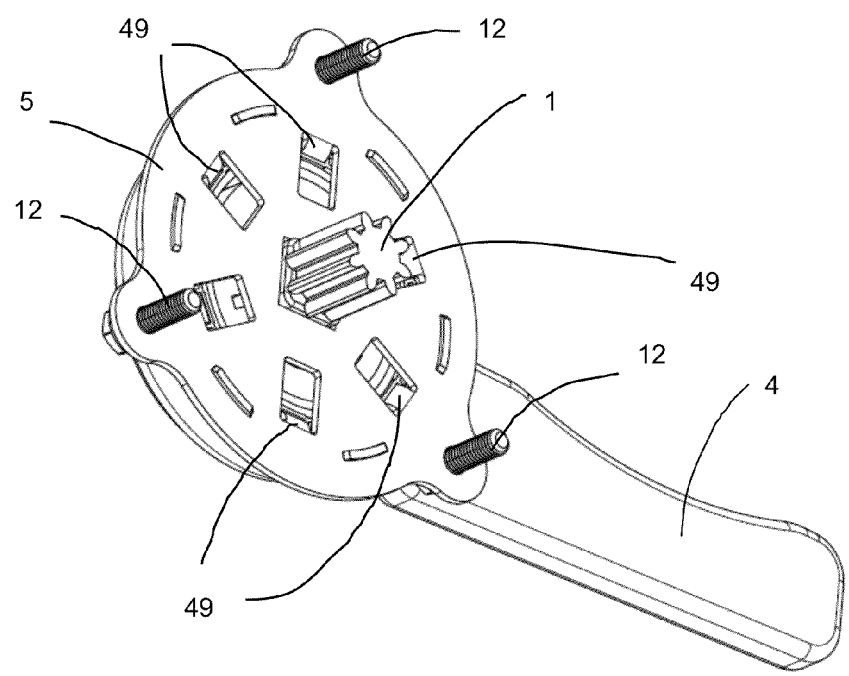
FIG. 27 is a rear perspective view of the device of FIG. 26.

In the embodiment illustrated in the accompanying figures, three pairs of clutch ball bearings 17 are provided. In the result, three clutch springs 16 are provided between each pair and three separators 47 are provided to separate adjacent pairs of ball bearings 17. It will be understood that the invention is not limited to this number of ball bearings and that any number of pairs of ball bearings 17 may be used. It will also be understood that the number of springs 16 and separators will be adjusted accordingly. For example, it may be preferred to incorporate six pairs of ball bearings 17 in order to provide a desired level of force. Such an embodiment is illustrated in FIGS. 26 and 27. As shown in FIGS. 26 and 27, in view of the doubling of the number of pairs of clutch ball bearings 17, a respective doubling in the number of clutch springs 16 and tabs 49 is also necessary.

The clutch mechanism of the present invention will now be described with reference to the clutch sub-assembly discussed above. As shown in FIGS. 8, 18 and 19, the driver drum 11 is provided with a number of inwardly deformed or indented sections 52. As shown in FIG. 8, when the clutch drum 14 is contained within driver drum 11, the indented sections 52 form wedge profiles at each of the locations of the indented sections 52. That is, the inwardly indented sections 52 result in a reduction in the radial separation between the generally coaxially arranged driver drum 11 and clutch drum 14. As illustrated in FIG. 8, such wedges serve to frictionally engage or lock the clutch ball bearings 17. As shown, in the preferred embodiment of the invention, an indented section 52 of the driver drum 11 is provided at the junction of adjacent pairs of clutch ball bearings 17, opposite the separators 47 and tabs 49. As can be seen in FIG. 8, the indented sections 52 are preferably wider than the separators 47 of the clutch carriage 15 and the tabs 49 of the inner plate cover 5. In this way, the clutch springs 16 separating respective pairs of clutch ball bearings 17 are further compressed. As can be seen in FIG. 8, this arrangement causes the clutch ball bearings 17 to be urged by the respective clutch springs 16 into the wedges formed between the indented sections 52 and the wall of the clutch drum 14. In other words, the clutch springs 16 provide tension to ensure that the clutch ball bearings 17 are maintained in a wedged arrangement between the 11 driver drum and the 14 clutch drum. This arrangement produces a frictional engagement between the driver drum 11 and the clutch ball bearings 17. For example, as can be seen, with a given pair of clutch ball bearings 17 (i.e. two ball bearings that are separated by a clutch spring 16), rotation of the driver drum 11 would result in movement of both of the ball bearings 17 of the given pair. In the result, a first of the ball bearings 17 would become disengaged from the wedge formed by one of the indentations 52 while the second ball bearing 17 would be further urged into the other of wedges, thereby becoming frictionally engaged therein. In such position, the second ball bearing 17 would frictionally engage the opposed walls of the driver drum 11 and the clutch drum 14. Therefore, further rotation of the driver drum 11, would result in rotation of the clutch drum 14 in the same direction due to the frictional force transferred through the second ball bearing.

As discussed above, the driver drum 11 is driven by the handle of the handle plate 6. As will be understood, once the handle is released, it is returned to its neutral position by means of the spring (i.e. torsion spring) 8.

Figure 12:
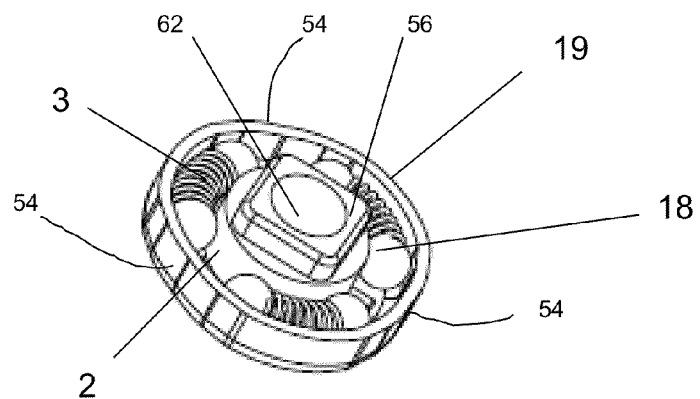
FIG. 12 is a top perspective view of a clamp or brake sub-assembly of the actuating device of the invention, comprising a brake drum, brake hub, brake springs and brake ball bearings according to an aspect of the invention.

A brake sub-assembly according to an aspect of the invention is provided by including between the brake drum 19 and the brake hub 2, a number of spring biased brake ball bearings 18. The ball bearings are biased apart with brake springs 3. The arrangement of brake ball bearings 18 is shown in isolation in FIG. 12. As shown, the brake ball bearings 18 are provided in pairs within the brake drum 19, with each of the pairs of ball bearings being separated by a brake spring 3. As shown in FIGS. 13 and 14, the brake drum 19 is provided with slots or apertures 48, preferably equidistantly arranged about the central axis of the drum 19. The slots 48 are adapted to receive tabs 50 that are provided on clutch drum 14. As shown in FIGS. 1, 8 and 9, when brake drum 19 is provided within the clutch drum 14, the tabs 50 extend through slots 48. As shown in FIGS. 8 and 9, adjacent pairs of brake ball bearings, once located in the brake drum 19, are separated by one of the tabs 50. The brake springs 3 urge the pairs of brake ball bearings against the tabs 50. In one embodiment as illustrated in the accompanying figures, three pairs of brake ball bearings 18 are provided. In the result, three brake springs 3 are provided between each pair and three tabs 50 are similarly provided to separate adjacent pairs of ball bearings 18. As discussed above with respect to the clutch mechanism, it will be understood that the invention is not limited to the above mentioned number of ball bearings and that any number of pairs of brake ball bearings 18 may be used. It will also be understood that the number of springs 3 and tabs 50 will be adjusted accordingly. As illustrated in FIGS. 26 and 27, although the number of clutch ball bearings 17 is varied, the arrangement of the brake mechanism is not affected by such variation in the clutch mechanism. In a similar way, the number of brake ball bearings may be varied without necessarily affecting the arrangement of the clutch mechanism. It will be understood that, depending on the need, one or both of the clutch and brake mechanisms may be varied as discussed herein.

The operation of brake mechanism of the invention will now be described with reference to FIGS. 8, 9 and 12-14 and the above description of the brake sub-assembly. As shown, the brake drum 19 is provided with a number of indentations 54 that comprise inward depressions, similar to the indentations 52 provided on the driver drum 11. As above, the indentations 54 form wedges with the hub 2. As shown, one indentation is preferably provided for each pair of brake ball bearings 18. The tabs 50 of the clutch drum 14 releases the brake ball bearings 18 from a "brake mode" or "brake position". The brake springs 3 urge the brake ball bearings 18 into the wedges formed between the brake drum 19 and the hub 2. As will be understood from the figures and the above description, due to the insertion of the tabs 50 of the clutch drum 14 into the slots 48 provided in the brake drum 19, rotation of the clutch drum 14 results in rotation of the brake drum 19. In addition, as mentioned above, rotation of the brake drum in turn causes rotation of the pinion gear 1 by virtue of the engagement of the body portion 26 of the pinion gear within the slot 21 of the brake drum 19.

As shown in FIG. 9, the brake hub 2 engages the brake ball bearings 18 due to the frictional engagement within the wedges formed between the walls of the brake hub 2 and the brake drum 19. The brake hub 2 is preferably fixed in position with respect to the inner plate cover 5. This is preferably achieved by providing the brake hub 2 with an engaging portion that engages the inner plate cover 5. As shown in FIGS. 1 and 22, the brake hub is provided with a generally square shaped engaging portion 56 that is adapted to be inserted into a correspondingly shaped slot or aperture 58. As will be understood, such an arrangement serves to prevent relative rotation between the brake hub 2 and the inner plate cover 5. It will also be understood that the same result may be achieved with other shapes of the engaging portion 56 and corresponding slot 58.

As shown in FIGS. 1 and 22, the inner plate cover 5 is also provided with bolt holes 60 on the outer perimeter thereof. As can be seen in FIGS. 1-4 and 7, the bolt holes 60 of the cover 5 are aligned with the bolt holes 38 provided in on the outer cup 7 and are adapted to receive the bolts 12 there-through. Thus, as with the outer cup 7, the inner plate cover 5 is also secured to the seat assembly and is immovable with respect to same. In view of the engagement between the inner cover plate 5 and the brake hub 2 as discussed above, it will therefore be understood that brake hub 2 is also maintained immovable with respect to the seat assembly and, therefore, the device 100 of the invention. In such arrangement, as theb brake bearing balls 18 frictionally engage the brake hub 2 within the wedge formed between the brake hub 2 and the brake drum 19, it will be understood that movement of the brake drum will be halted.

As can be seen in for example FIGS. 8 and 9, rotation of the clutch drum 14 causes the tabs 50 of the clutch drum 14 to release the brake ball bearings 18 in the annular space between the brake hub 2 and the brake drum 19. As mentioned above, the brake drum 19 includes a slot 21 (as shown in FIGS. 13 and 14) which corresponds in shape to the body portion 26 of the pinion gear 1. In such manner, rotation of the pinion gear 1 is tied to the rotation of the brake drum 19. Further, as shown for example in FIG. 12, the brake hub 2 is provided with a generally central aperture 62 through which the body portion 26 of the pinion gear 1 is rotatably provided. Thus, as will be understood, the pinion gear 1 is therefore rotatable with respect to the brake hub 2 but no respective rotation between the pinion gear 1 and the brake drum 19 is possible.

FIG. 9 illustrates the device 100 with the brake ball bearings 18 engaged in the wedge formed between the brake hub 2 and the brake drum 19. In this "brake mode", wherein the handle plate 6 is in its neutral position, relative rotation between the brake drum 19 and the brake hub 2 is prevented. Actuation or rotation of the handle plate 6 causes rotation of the clutch drum 14 (as discussed above). In the result, the tabs 50 of the clutch drum 14 are also rotated, which in turn displaces one of each of the pairs of ball bearings 18 from the wedge it is contained in and compresses the brake springs 3. It will be understood from FIG. 9 that the brake ball bearing 18 that is dislodged will depend on the direction in which the handle plate 6 is rotated. Dislodging of the ball bearings 18 allows the tabs 50 to rotate the brake drum 19 and, thereby rotation of the pinion gear 1. As described above, the handle plate 6 is permitted to rotate only through the arc of the curved slots 36 provided in the outer cup 7 (within which the handle plate rivets 10 travel). Thus, when the handle plate 6 reaches the maximum rotation distance, further rotation is prevented, thereby stopping rotation of the pinion gear 1.

As will be understood from the above description of the device 100, rotation of the handle plate 6 drives the following:
  rotation of the driver drum 11, due to engagement of the handle plate 6 with the handle plate rivets 10, which may also be referred to as "motion translation means";
  one of each of the pairs of clutch ball bearings 17 (dependent upon the direction in which the handle plate 6 is rotated), due to frictional engagement of the clutch ball bearings 17 with the driver drum 11;
  the clutch drum 14, due to frictional engagement of the clutch drum 14 with the clutch ball bearings 17;
  one of each of the pairs of brake ball bearings 18 (dependent upon the direction in which the handle plate 6 is rotated), due to frictional engagement of the brake ball bearings and the clutch drum 14;
  and the brake drum 19, due to the engagement of the tabs 50 of the clutch drum 14 and the slots 48 of the brake drum 19, wherein the tabs 50 may be referred to as "motion translation means".

In the result, it will be understood that the movement of the handle plate 6 causes the release of the brake mechanism of the device, to allow rotation of the pinion gear 1 in one direction, but also causes the clutch mechanism of the device to become engaged to prevent the pinion gear 1 from rotating in the opposite direction.

Once the handle plate 6 reaches its maximum rotation distance, it can be released, which would allow the torsion spring 8 to return the handle plate 6 to its neutral position, wherein the device 100 re-enters the "brake" mode.

In the above description, reference has been made to "ball bearings" for use in the clutch and brake mechanisms. However, it will be understood that this term is also intended to include other types of rollers or rolling members as known in the art.

Figure 28:
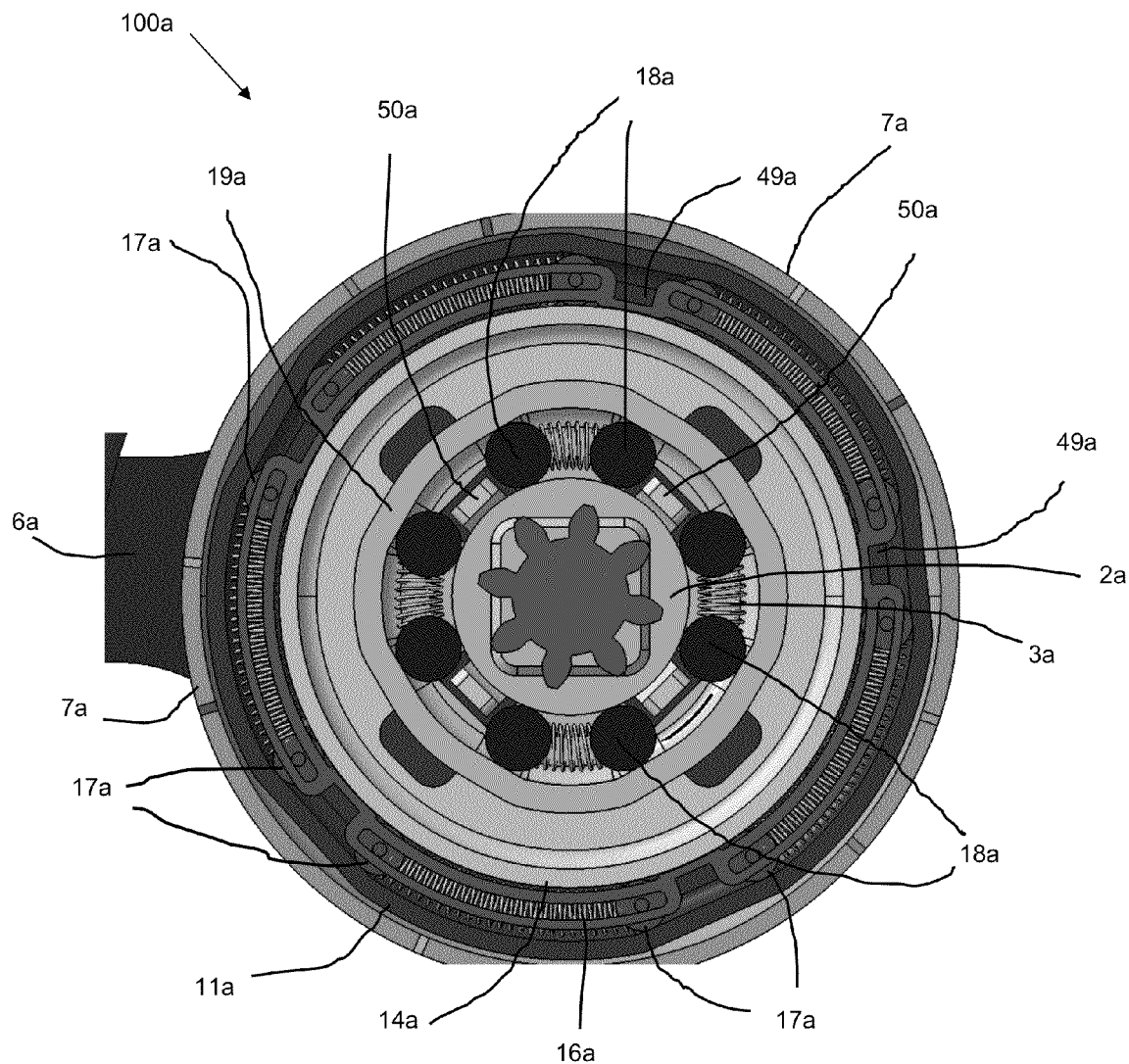
FIG. 28 is a cross sectional top view of the actuating device according to another embodiment of the invention, and illustrating the clutch mechanism.

FIG. 28 illustrates another embodiment of the invention, wherein elements that are similar to those described above are identified with the same reference numerals but with the letter "a" added for clarity. In the embodiment shown in FIG. 28, the actuating device 100a is provided with rollers, 17a and 18a, instead of ball bearings. In one aspect, the rollers may be held in position using positioning pins extending axially through the rollers, and over which the rollers may rotate. It will be understood that such pins are optional and may not be needed in all cases. The embodiment shown in FIG. 28 is also of a generally larger size than that shown in previous figures and, as such, includes additional rollers, 17a and 18a. In the result, as shown in FIG. 28 and as will be understood by persons skilled in the art, the various indentations or contact points provided on the brake drum 19a and the driver drum 11a would be adjusted accordingly.

The device described herein is particularly suited for connecting to and actuating any seat lift height adjusting mechanism provided on seat assembly. In particular, the present device is well suited for use in vehicles. However, as will be understood by persons skilled in the art, the use of the present device with vehicle seat height adjustment mechanisms is a preferred embodiment of the invention and that the present device may be used with any other mechanism that is actuated by a rotating member.

In one aspect of the invention, the various components described herein are designed to be suitable for manufacturing by known stamping processes. As will be understood by persons skilled in the art, such advantage results in reduced production costs for the device of the invention. The components of the invention that are particularly suited for manufacture by stamping methods include the handle plate 6, the driver drum 11, the clutch drum 14 and the brake drum 19. However, it will be understood that other components of the invention may also be manufactured by known, low cost methods.

Further, the device of the invention provides the required brake and clutch mechanisms as a relatively compact and low weight component, thereby overcoming the constraints of providing the device inside a vehicle environment.

Although the invention has been described with reference to certain specific embodiments, various modifications thereof will be apparent to those skilled in the art without departing from the purpose and scope of the invention as outlined in the claims appended hereto. Any examples provided herein are included solely for the purpose of illustrating the invention and are not intended to limit the invention in any way. Any drawings provided herein are solely for the purpose of illustrating various aspects of the invention and are not intended to be drawn to scale or to limit the invention in any way. The disclosures of all prior art recited herein are incorporated herein by reference in their entirety.

We claim:

1. An actuating device comprising a handle, a housing, and a driven member, the driven member being rotatable about a longitudinal axis thereof, the housing containing:
    a brake mechanism, for restricting rotation of the driven member when the brake mechanism is engaged;
    a means for disengaging the brake mechanism;
    a means for rotating the driven member in either the clockwise or counter-clockwise direction; and,
    a clutch mechanism for restricting reverse rotation of the driven member when driven in the clockwise or counter-clockwise direction;
    wherein the clutch mechanism comprises:
        a driver drum and a clutch drum, the driver drum and clutch drum being generally coaxially aligned, and wherein the driver drum has a larger radius than the clutch drum; and,
        a plurality of clutch rotating members positioned between the driver drum and the clutch drum, the clutch rotating members being adapted for frictionally contacting an inner surface of the driver drum and an outer surface of the clutch drum;
        and wherein the driver drum is provided with a plurality of inward deformations for frictionally engaging the clutch rotating members between the driver drum and he clutch drum;
    and wherein the brake mechanism comprises:
        a brake drum and a hub, the brake drum and hub being generally coaxially aligned, and wherein the brake drum has a larger radius than the hub; and,
        a plurality of brake rotating members positioned between the hub and the brake drum, the brake rotating members being adapted for frictionally contacting an outer surface of the hub and an inner surface of the brake drum;
        and wherein the brake drum is provided with a plurality of inward deformations for frictionally engaging the brake rotating members between the brake drum and the hub;
    and wherein:
        the driven member is operably connected to the brake drum, whereby rotation of the driven member is driven by rotation of the brake drum;
        the brake drum is operably connected to the clutch drum, whereby rotation of the brake drum is driven by rotation of the clutch drum; and
        the clutch drum is operably connected to the driver drum, whereby rotation of the clutch drum is driven by rotation of the driver drum.

2. The actuating device of claim 1, wherein motion of the handle is translated to the driven member through a plurality of members generally coaxially aligned and in frictional engagement.

3. The actuating device of claim 2, wherein the frictional engagement is provided by ball bearings or rollers provided between adjacent rotating members.

4. The actuating device of claim 3, wherein the ball bearings or rollers are provided in pairs and wherein each pair of ball bearings or rollers is separated by a respective biasing member.

5. The actuating device of claim 4, wherein the biasing members are springs.

6. The actuating device of claim 1, wherein the handle includes a motion translating means for translating motion of the handle to the driver drum.

7. The actuating device of claim 1, wherein the clutch rotating members are ball bearings or rollers.

8. The actuating device of claim 1, wherein the clutch rotating members are provided in pairs and wherein each pair of rotating members is biased apart by a respective biasing means.

9. The actuating device of claim 8, wherein the biasing means comprise springs.

10. The actuating device of claim 1, wherein the clutch rotating members are constrained within a carriage.

11. The actuating device of claim 1, wherein the clutch drum includes a motion translation means for translating motion of the clutch drum to the brake drum.

12. The actuating device of claim 1, wherein the brake rotating members are ball bearings or rollers.

13. The actuating device of claim 1, wherein the brake rotating members are provided in pairs and wherein each pair of brake rotating members is biased apart by a respective biasing means.

14. The actuating device of claim 13, wherein the biasing means comprise springs.

15. The actuating device of claim 1, wherein the handle is biased by a handle biasing member for returning the handle to a neutral position.

16. The actuating device of claim 1, wherein the driven member is adapted for connection to a seat height adjustment mechanism of a vehicle.

17. The actuating device of claim 1, wherein the driver drum is operably connected to the handle, wherein rotation of the driver drum is driven by movement of the handle.

18. The actuating device of claim 1, wherein the brake mechanism and the clutch mechanism are co-planar.

* * * * *